US011876234B2

(12) United States Patent
Onishi et al.

(10) Patent No.: US 11,876,234 B2
(45) Date of Patent: Jan. 16, 2024

(54) EXPLOSION-PROOF APPARATUS

(71) Applicant: MITSUBISHI HEAVY INDUSTRIES, LTD., Tokyo (JP)

(72) Inventors: Ken Onishi, Tokyo (JP); Koji Shukutani, Tokyo (JP); Hiroyoshi Okazaki, Tokyo (JP); Syuhei Kobori, Tokyo (JP); Noriko Onishi, Tokyo (JP); Hiroyoshi Kojima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 516 days.

(21) Appl. No.: 17/255,041

(22) PCT Filed: Mar. 7, 2019

(86) PCT No.: PCT/JP2019/009138
§ 371 (c)(1),
(2) Date: Dec. 22, 2020

(87) PCT Pub. No.: WO2020/012706
PCT Pub. Date: Jan. 16, 2020

(65) Prior Publication Data
US 2021/0265688 A1     Aug. 26, 2021

(30) Foreign Application Priority Data
Jul. 13, 2018   (JP) ................. 2018-133224

(51) Int. Cl.
*H01M 50/143*     (2021.01)
*H01M 50/367*     (2021.01)
(Continued)

(52) U.S. Cl.
CPC .......... *H01M 50/143* (2021.01); *G03B 17/02* (2013.01); *H01M 50/24* (2021.01);
(Continued)

(58) Field of Classification Search
CPC .. H01M 50/143; H01M 50/24; H01M 50/367; H01M 10/425; H01M 50/202;
(Continued)

(56) References Cited

U.S. PATENT DOCUMENTS

2002/0089589 A1* 7/2002 Adair ................. A61B 1/00048
348/14.02
2009/0059492 A1* 3/2009 Glover ................... H01H 13/86
361/679.56
(Continued)

FOREIGN PATENT DOCUMENTS

CN      108110174 A    6/2018
JP      H03-39747 Y2   8/1991
(Continued)

OTHER PUBLICATIONS

Written Opinion dated May 21, 2019, issued in counterpart to Application No. PCT/JP2019/009138, with English Translation. (9 pages).
(Continued)

*Primary Examiner* — Albert H Cutler
(74) *Attorney, Agent, or Firm* — WHDA, LLP (57) ABSTRACT

An explosion-proof apparatus includes a frame having a hollow shape; a gas supply device configured to maintain inside of the frame at pressure higher than certain pressure by supplying gas to the inside; an electrical component disposed inside the frame; a battery configured to supply power to the electrical component; a protective device configured to stop power supply from the battery to the electrical component; a battery housing enclosure being an increased-safety explosion-proof enclosure configured to house the battery therein; and a protective device housing enclosure being a flameproof explosion-proof enclosure configured to house the protective device. The battery does
(Continued)

not include a management device that manages parameters of the battery.

4 Claims, 6 Drawing Sheets

(51) Int. Cl.
*H01M 50/24* (2021.01)
*H04N 23/51* (2023.01)
*G03B 17/02* (2021.01)
*H02H 5/08* (2006.01)
*H02H 7/18* (2006.01)
*H02K 5/136* (2006.01)
*H04N 23/57* (2023.01)
*H04N 23/54* (2023.01)
*B25J 19/00* (2006.01)

(52) U.S. Cl.
CPC ............ *H01M 50/367* (2021.01); *H02H 5/08* (2013.01); *H02H 7/18* (2013.01); *H02K 5/136* (2013.01); *H04N 23/51* (2023.01); *H04N 23/54* (2023.01); *H04N 23/57* (2023.01); *B25J 19/005* (2013.01)

(58) Field of Classification Search
CPC ........... H01M 50/383; H01M 2200/00; H01M 2010/4271; H01M 2200/20; H01M 6/50; H01M 10/48; H01M 50/569; H01M 50/578; H01M 50/242; G03B 17/02; G03B 17/08; H02H 5/08; H02H 7/18; H02K 5/136; H04N 23/51; H04N 23/54; H04N 23/57; H04N 23/555; B25J 19/005; B25J 11/00; Y02E 60/10
See application file for complete search history.

(56) References Cited

U.S. PATENT DOCUMENTS

| | | | |
|---|---|---|---|
| 2009/0142629 A1* | 6/2009 | Titschert | H01M 50/571 429/185 |
| 2018/0131177 A1* | 5/2018 | Onishi | H02H 9/008 |
| 2020/0152932 A1* | 5/2020 | Ozawa | H01M 10/653 |

FOREIGN PATENT DOCUMENTS

| | | | | |
|---|---|---|---|---|
| JP | H10-288689 A | 10/1998 | | |
| JP | 2001-355831 A | 12/2001 | | |
| JP | 2006-234728 A | 9/2006 | | |
| JP | 2015-36172 A | 2/2015 | | |
| JP | 2017-60331 A | 3/2017 | | |
| WO | WO-2017047159 A1 * | 3/2017 | ........ | H01M 10/0525 |
| WO | 2017/081846 A1 | 5/2017 | | |
| WO | 2018/078950 A1 | 5/2018 | | |

OTHER PUBLICATIONS

Extended (Supplementary) European Search Report dated Jul. 5, 2021, issued in counterpart EP Application No. 19833837.8. (9 pages).

* cited by examiner

EXPLOSION-PROOF APPARATUS

FIELD

The present invention relates to an explosion-proof apparatus.

BACKGROUND

Using a device under an explosive atmosphere involves a risk of a fire started when sparks caused by operation of the device ignite. For this reason, an explosion-proof structure may be applied. For example, Patent Literature 1 describes an explosion-proof apparatus provided with an internally pressurized explosion-proof structure. This structure maintains the internal pressure thereof higher than the external pressure thereof and thus prevents inflammable gas from entering the inside thereof. Patent Literature 1 describes the explosion-proof apparatus as being provided with: a battery that supplies power to an electrical component of the explosion-proof apparatus; and a protective device that shuts off power supply from the battery when an abnormality occurs. In Patent Literature 1, the battery and the protective device are housed in a flameproof explosion-proof enclosure.

CITATION LIST

Patent Literature

Patent Literature 1: Japanese Patent Application Laid-open No. 2017-060331

SUMMARY

Technical Problem

However, when the battery and the protective device are housed in a flameproof explosion-proof enclosure, the size and the weight of the explosion-proof apparatus as a whole are larger and heavier than otherwise. It is therefore needed to configure an explosion-proof apparatus in such a manner as both to prevent ignition therein and to avoid increasing the size and the weight thereof.

The present invention has been made to solve the above-described inconvenience, and an object of the present invention is to provide an explosion-proof apparatus capable of preventing ignition therein and avoiding increasing the size and the weight thereof.

Solution to Problem

In order to achieve the object described above, an explosion-proof apparatus according to the present disclosure includes a frame having a hollow shape; a gas supply device configured to maintain inside of the frame at pressure higher than certain pressure by supplying gas to the inside; an electrical component disposed inside the frame; a battery configured to supply power to the electrical component; a protective device configured to stop power supply from the battery to the electrical component; a battery housing enclosure being an increased-safety explosion-proof enclosure configured to house the battery therein; and a protective device housing enclosure being a flameproof explosion-proof enclosure configured to house the protective device. The battery housing enclosure does not include therein a management device that manages parameters of the battery.

According to this explosion-proof apparatus, the protective device is housed in the protective device housing enclosure, and the battery is housed in the battery housing enclosure. Thus, increasing the size and the weight thereof can be avoided while ignition is prevented.

Preferably, the battery housing enclosure includes a fixation part that fixes the battery to inside of the battery housing enclosure, and the fixation part is provided at a position such that a distance between the battery fixed and an outer circumference of the battery housing enclosure is a certain distance. According to this explosion-proof apparatus, the certain distance is maintained. Thus, ignition from the battery can be appropriately prevented.

Preferably, the certain distance is a distance greater than or equal to a distance at which the battery and the outer circumference of the battery housing enclosure are kept insulated from each other. According to this explosion-proof apparatus, the insulation distance is maintained between the battery and the outer circumference of the battery housing enclosure. Thus, ignition from the battery can be appropriately prevented.

Preferably, the battery housing enclosure and the protective device housing enclosure are provided outside the frame. According to this explosion-proof apparatus, the size of the frame is made smaller than otherwise. Thus, the internal pressure can be suitably adjusted.

Preferably, the battery housing enclosure and the protective device housing enclosure are provided inside the frame. According to this explosion-proof apparatus, ignition can be appropriately prevented while increasing the size and the weight thereof is avoided.

Preferably, included is further an image capturing unit configured to capture an image of surroundings of the frame, and the image capturing unit includes an imaging element provided outside the frame; a transmission board provided outside the frame and connected to the imaging element to amplify electric signals that are acquired by the imaging element; and a control device provided inside the frame and connected to the transmission board to acquire, as data for the captured image of the surroundings of the frame, the amplified electric signals from the transmission board. According to this explosion-proof apparatus, increasing the size and the weight thereof can be avoided.

Advantageous Effects of Invention

According to the present invention, increasing a size and a weight can be avoided while ignition is prevented.

DESCRIPTION OF DRAWINGS

The following describes a preferred embodiment according to the present invention in detail with reference to the accompanying drawings. This embodiment is not intended to limit the present invention. Constituent elements in the following embodiment include those replaceable by the skilled person or those substantially identical to each other.

Figure 1:
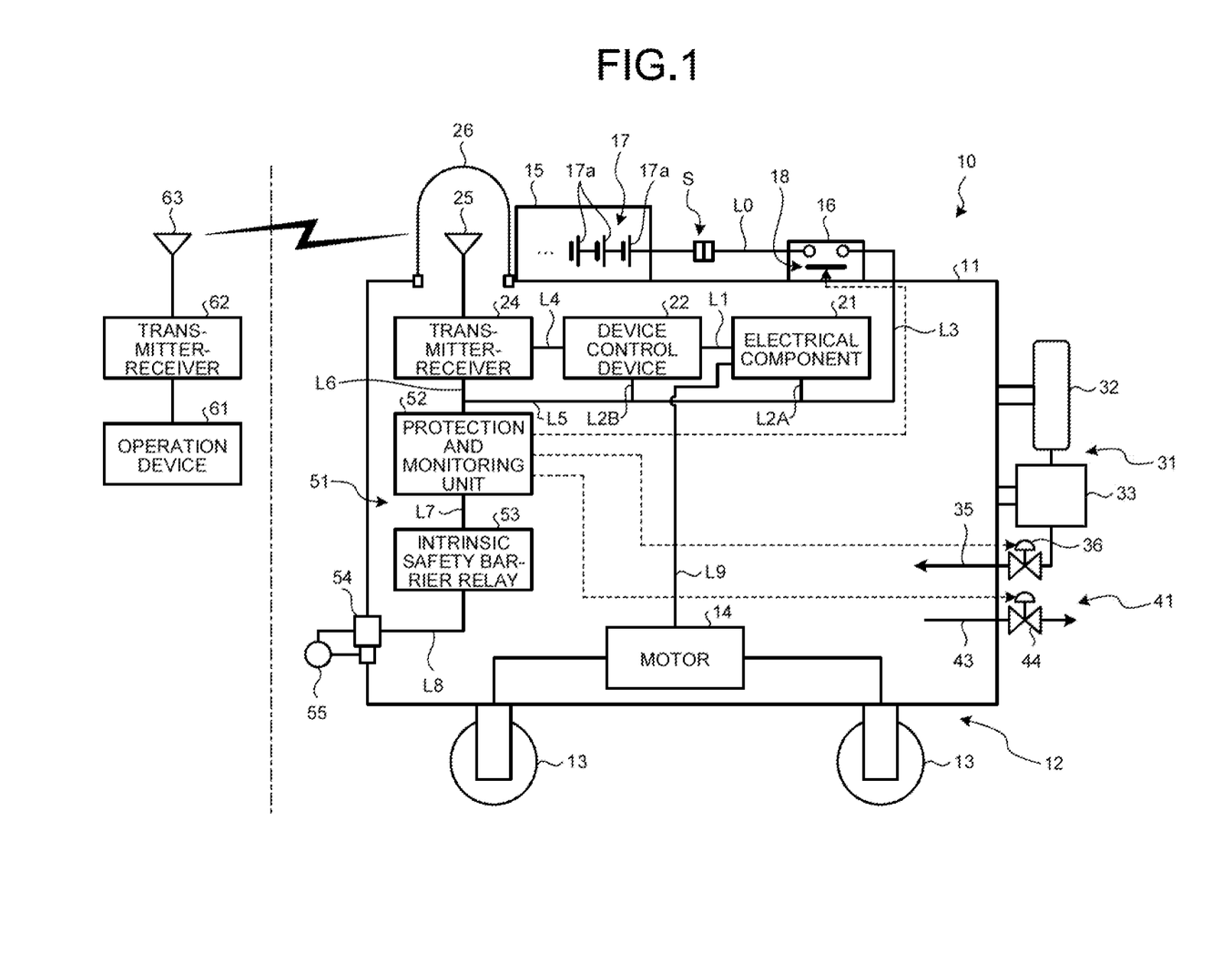
FIG. 1 is a schematic configuration diagram of an explosion-proof apparatus according to the present embodiment.

Entire Configuration of Explosion-proof apparatus FIG. 1 is a schematic configuration diagram of an explosion-proof apparatus according to the present embodiment. An explosion-proof apparatus 10 according to the present embodiment is a device that performs tasks under an explosive atmosphere and that is provided with an explosion-proof structure. In the present embodiment, the explosion-proof apparatus 10 is an industrial robot that performs tasks such as a disaster prevention support task, a building maintenance task, and patrol, under an explosive atmosphere. The explosion-proof apparatus 10 performs tasks in working environments in fields that are in many cases those in which inflammable gas is likely to be generated. Examples of the working environment include a petrochemical plant; a place in which a hazardous material such as a combustible liquid is manufactured, stored, or handled; a paint facility; a work site where a solvent is used; a high-pressure gas facility; and a fuel-cell related facility.

As illustrated in FIG. 1, the explosion-proof apparatus 10 includes a frame 11, a battery housing enclosure 15, and a protective device housing enclosure 16. The explosion-proof apparatus 10 is configured to be movable by having a moving device 12 under the frame 11, which has a hollow shape. The moving device 12 includes driven wheels 13. That is, the frame 11 is provided with four driven wheels 13, as a traveling body, under the frame 11 and thus can be driven to rotate by a motor 14 that is disposed inside the frame 11. The traveling body is not limited to the driven wheels 13 and may be, for example, a crawler.

The frame 11 is a main body portion of the explosion-proof apparatus 10 and has various devices housed therein. The devices that are housed in the frame 11 are described below. The frame 11 has a hollow shape and is configured as an enclosure that prevents explosive gas from entering the inside of the frame 11 from the outside by maintaining the internal gas pressure of the frame 11 higher than the external gas pressure thereof. That is, the frame 11 is an internally pressurized explosion-proof enclosure, which has an internally pressurized explosion-proof structure. An internally pressurized explosion-proof structure means a structure obtained by: housing, in an enclosure that has certain specifications, an electrical device or a portion that can be an ignition source for an explosive gas; sending a gas (protective gas) such as air or nitrogen into the inside of the enclosure; and pressurizing the gas inside. The structure consequently isolates the electrical device or the portion from an external explosive atmosphere. The detailed specifications of an internally pressurized explosion-proof structure are assumed to conform to Recommended Practices for Explosion-Protected Electrical Installations in General Industries (2008Ex). If future revisions are made to those recommended practices, terms that are used in the present embodiment shall be understood based on such revisions. It is preferable that the frame 11 be tightly sealed so that the internal pressure can be maintained. That is, it is preferable that connections of members such as wiring L3 to the outside be sealed in the frame 11.

The battery housing enclosure 15 is an enclosure that is attached to the frame 11 and that houses a battery 17 inside. In the present embodiment, the battery housing enclosure 15 is provided outside of the frame 11. The structure of the battery housing enclosure 15 is described below.

The battery 17 is a battery that supplies power to the various devices (such as the motor 14, an electrical component 21 described below, an equipment control device 22, and a transmitter-receiver 24) provided inside the frame 11. The battery 17 is, for example, a battery composed of a plurality of battery cells 17a connected in series. More specifically, the battery 17 is a battery that does not include a management device, that is, a battery management unit (BMU). As used herein, a management device is a device that manages various parameters (for example, the charge amount, the amount of current, and the temperature) of a battery. The battery 17 is a battery that is not provided with such a management device. The battery 17 therefore can be described as including no component, other than the battery cells 17a, that can be an ignition source for an external explosive gas around the explosion-proof apparatus 10. In other words, this indicates that the explosion-proof apparatus 10 includes, inside the battery housing enclosure 15, no management device that manages parameters of the battery 17, and includes no component, other than the battery cells 17a, that can be an ignition source inside the battery housing enclosure 15. The battery 17 may be any desired battery that includes no management device, that is, includes no ignition source other than the battery cells 17a and may be either a primary battery or a secondary battery. However, examples of the battery 17 do not include a lithium-ion secondary battery. Examples of the battery 17 include a nickel-cadmium storage battery, a nickel-hydrogen storage battery, and a lead storage battery (lead-acid secondary battery). The explosion-proof apparatus 10 may include, outside the battery housing enclosure 15 (for example, inside the frame 11), a management device that manages the parameters of the battery 17. In this case, the battery 17 is managed by the management device provided outside of the battery housing enclosure 15.

The protective device housing enclosure 16 is an enclosure that is attached to the frame 11 and houses a protective device 18 inside. In the present embodiment, the protective device housing enclosure 16 is provided outside of the frame 11. The protective device housing enclosure 16 is an enclosure different from the battery housing enclosure 15 and is provided outside the battery housing enclosure 15. The structure of the protective device housing enclosure 16 is described below. In the present embodiment, the battery housing enclosure 15 is also provided outside the protective device housing enclosure 16.

The protective device 18 is an interlocking breaker, that is, a relay device, that is configured to be capable of shutting off power supply from the battery 17 to the various devices in the frame 11. Normally, the protective device 18 is closed and connects the battery 17 to the various devices in the frame 11 so that power can be supplied to the various devices. When an abnormality occurs, a protection and monitoring unit 52 described below operates to switch the protective device 18 to an open state, whereby the protective device 18 turns the battery 17 and each of the various devices in the frame 11 into a state in which power cannot be supplied, that is, a disconnected state. A logic for the switching of the protective device 18 is described below.

The battery 17 and the protective device 18 are connected to each other via an electrical wire (power wire) L0. The electrical wire L0 is provided with an explosion-proof connector S. The explosion-proof connector S is provided outside the frame 11, the battery housing enclosure 15, and the protective device housing enclosure 16. The battery 17 is connected to the protective device 18, that is, the explosion-proof apparatus 10 via the explosion-proof connector S. The battery 17 is detached from the protective device 18, that is, the explosion-proof apparatus 10, when the explosion-proof connector S is detached. Thus, the battery 17 is attachable to and detachable from the explosion-proof apparatus 10 by means of the explosion-proof connector S. Therefore, the explosion-proof apparatus 10 enables, for example, easy replacement and easy charging of the battery 17 because there is no need to open the frame 11 and interrupt an internally pressurized explosion-proof state. However, it is not necessary to provide the explosion-proof connector S. The battery 17 may be connected directly to the protective device 18 via the electrical wire L0. Herein, an explosion-proof connector is a connector that is explosion proof, and is, for example, a connector that is pressure-resistance explosion proof.

The frame 11 includes therein the motor 14, the electrical component 21, the equipment control device 22, the transmitter-receiver 24, and the antenna 25. The explosion-proof apparatus 10 is provided with a robot arm, which is not illustrated. The electrical component 21 includes a motor and various sensors for operating the robot arm. The frame 11 is provided not only with the robot arm, for example, but also with a variety of equipment such as a winch device and a lighting device.

The electrical component 21 and the equipment control device 22 are connected to each other via an electrical wire (signal wire) L1. The equipment control device 22 is capable of controlling the electrical component 21. The electrical component 21 is connected also to the battery 17 via electrical wires (power wires) L2A and L3. More specifically, the electrical component 21 is connected via the electrical wire L2A to the electrical wire L3 that is connected to the protective device 18. Therefore, the electrical component 21 is connected to the protective device 18 via the electrical wires L2A and L3, and is connected to the battery 17 via the protective device 18 and the electrical wire L0. The equipment control device 22 is connected also to the battery 17 via electrical wires (power wires) L2B and L3. More specifically, the equipment control device 22 is connected via the electrical wire L2B to the electrical wire L3 that is connected to the protective device 18. Therefore, the equipment control device 22 is connected to the protective device 18 via the electrical wires L2B and L3, and is connected to the battery 17 via the protective device 18 and the electrical wire L0. The electrical wires L2A and L2B are connected to the electrical wire L3 in parallel to each other.

The motor 14 is a part of the electrical component 21 and is connected to the rest of the electrical component 21 via an electrical wire (signal wire) L9. That is, the motor 14 is connected to the battery 17 via the electrical wire L2A, the electrical wire L3, the protective device 18, and the electrical wire L0.

The transmitter-receiver 24 is connected to the antenna 25. This antenna 25 is disposed inside an airtight dome 26 through which radio waves can pass. The transmitter-receiver 24 is connected also to the equipment control device 22 via an electrical wire (signal wire) L4 and is further connected to the battery 17 via the electrical wire L3, the protective device 18, and the electrical wire L0 by being connected to an electrical wire (power wire) L5.

The frame 11 is provided with an air supply device 31 that supplies gas to the inside of the frame 11. The frame 11 has an air tank 32 and a pressure-reducing device 33 attached to the outside of the frame 11. The air supply device 31 is configured of an air supply line 35 provided in such a manner as to extend out from the air tank 32 provided outside the frame 11, then penetrate through the frame 11, and extend into the inside of the frame 11. The air supply line 35 has a pressure-reducing valve 36 provided outside the frame 11 and has ends of the air supply line 35 opened. Thus, normally, pressurized air in the air tank 32 is supplied to the inside of the frame 11 through the air supply line 35, and the pressure-reducing valve 36 maintains the internal pressure of the frame 11 as a constant set pressure that is higher than the external pressure thereof.

The frame 11 is also provided with a gas-discharging device 41 that discharges gas that is present inside. The gas-discharging device 41 is configured of an air discharge line 43 that penetrates the frame 11 and extends into the inside of the frame 11. The air discharge line 43 has a relief valve 44 provided outside the frame 11 and has ends of the relief valve 44 opened. Thus, when the internal temperature of the frame 11 increases to the extent that the internal pressure of the frame 11 surpasses the set pressure, the relief valve 44 reduces the internal pressure of the frame 11 by discharging air present inside the frame 11 to the outside of the frame 11 through the air discharge line 43.

The frame 11 has a protection and monitoring device 51 installed in the inside of the frame 11. This protection and monitoring device 51 includes the protection and monitoring unit 52 and an intrinsic safety barrier relay (intrinsically safe model) 53. The protection and monitoring unit 52 is connected to the transmitter-receiver 24 via an electrical wire (power wire) L6 and is connected to the intrinsic safety barrier relay 53 via an electrical wire (signal wire) L7. To the intrinsic safety barrier relay 53, a pressure detector 55 is connected with an electrical wire (signal wire) L8 extending into the outside through a shield 54. This pressure detector 55 is connected to the inside of the frame 11 via piping of the frame 11, and detects the internal pressure of the frame 11.

The protection and monitoring unit 52 is capable of opening and closing the pressure-reducing valve 36 and the relief valve 44 in accordance with pressure that is detected by the pressure detector 55. That is, the protection and monitoring unit 52 controls opening and closing of the pressure-reducing valve 36 and the relief valve 44 so that the internal pressure of the frame 11 can be maintained higher than a certain pressure.

The protection and monitoring unit 52 is also capable of operating the protective device 18. Thus, when the internal pressure of the frame 11 is below a certain pressure, the protection and monitoring unit 52 operates the protective device 18 to bring the protective device 18 into an open state. The protection and monitoring unit 52 thereby stops power supply from the battery 17 to the electrical component 21, the equipment control device 22, the transmitter-receiver 24, and the motor 14.

A transmitter-receiver 62 is connected to an operation device 61, and the transmitter-receiver 62 include the antenna 63. The transmitter-receivers 24 and 62 function as communication devices and are capable of wirelessly transmitting and receiving various signals. The operation device 61 is capable of transmitting a control signal to the equipment control device 22 via the transmitter-receivers 24 and 62 and is capable of receiving various information signals from the equipment control device 22. The explosion-proof apparatus 10 herein is a robot that can autonomously travel by being controlled by the equipment control device 22 but may be enabled to autonomous travel by having the moving device 12 controlled remotely.

The explosion-proof apparatus 10 desirably has the operation device 61 and the equipment control device 22 connected via communication optical fibers in consideration of a possible failure of the transmitter-receiver 24 or 62. In this case, even if a failure occurs with the transmitter-receiver 24 or 62, the communication optical fibers can be used for transmission and reception between the operation device 61 and the equipment control device 22. In addition, even if the communication optical fibers are cut, transmission and reception between the operation device 61 and the equipment control device 22 can be performed using the transmitter-receivers 24 and 62.

The explosion-proof apparatus 10 thus configured starts with operating the protective device 18 in a safe place where no explosion-proof gas is present. The explosion-proof apparatus 10 then start power supply from the battery 17 to the electrical component 21, the equipment control device 22, the transmitter-receiver 24, and the motor 14 and performs explosion-proof operation whereby no inflammable gas is prevented from entering the inside of the frame 11. That is, the air supply device 31 is caused to supply air in the air tank 32 to the inside of the frame 11 through the air supply line 35, whereby pressure inside the frame 11 is raised. Consequently, the gas-discharging device 41 discharges air in the inside of the frame 11 to the outside thereof through the air discharge line 43 via the relief valve 44.

During this operation, the amount of gas that is being supplied through the air supply line 35 to the inside of the frame 11 is larger than the amount of gas that is being discharged through the air discharge line 43 to the outside of the frame 11, whereby the internal pressure of the frame 11 rises. Thereafter, when gas pressure inside the frame 11 exceeds a certain value, the pressure detector 55 outputs a signal to the protection and monitoring unit 52 via the intrinsic safety barrier relay 53, and the protection and monitoring unit 52 excites and closes the relief valve 44, thereby completing scavenging.

After the completion of scavenging in the inside of the frame 11, the explosion-proof apparatus 10 explosive gas enters an environment in which explosive gas is present and performs a task there. While the task is performed there, the protection and monitoring unit 52 controls opening and closing of the pressure-reducing valve 36 so that the internal pressure of the frame 11 can be maintained at a certain value that is higher than a value at which the external pressure of the frame 11 is.

(Structures of Enclosures)

Next, the structures of the battery housing enclosure 15 and the protective device housing enclosure 16 are described in detail. The battery housing enclosure 15 is an enclosure that is provided on the outside of the frame 11 and that houses the battery 17 inside. The battery housing enclosure 15 is an increased-safety explosion-proof enclosure that has an increased-safety explosion-proof structure. The increased-safety explosion-proof structure means a structure the safety level of which is enhanced so that an object housed inside can be prevented from generating electric sparks or a high temperature. More specifically, the battery housing enclosure 15 is an enclosure that houses thereon an object housed inside, that is, the battery 17, in such a manner as to keep the battery 17 at certain distances from the outer circumference of the battery housing enclosure 15. In other words, the battery housing enclosure 15 is an enclosure that holds the battery 17 so that the battery 17 and the outer circumference of the battery housing enclosure 15 can keep distances (creeping distance and spatial distance) from each other at prescribed distances with which insulation therebetween can be maintained. That is, the certain distance herein means a distance the length of which is an insulation distance. The battery housing enclosure 15 prevents ignition from the battery 17 by thus maintaining the battery 17 and the outer circumference of the battery housing enclosure 15 at insulation distances from each other. Any desired increased-safety explosion-proof enclosure may be used as the battery housing enclosure 15 regardless of whether the enclosure is tightly sealed, and may be an enclosure that communicates with the outside thereof. The battery housing enclosure 15 may be a flameproof explosion-proof enclosure instead of an increased-safety explosion-proof enclosure. Inside the battery housing enclosure 15, conductors having different potentials are maintained at prescribed distances from each other that enables the conductors to be kept insulated from one another. Therefore, inside the battery housing enclosure 15, distances between the terminals in the battery 17, that is, distances (creeping distances and spatial distances) between the battery cells 17a, are maintained at prescribed distances that enables the battery cells 17a to be kept insulated from one another.

Figure 2:
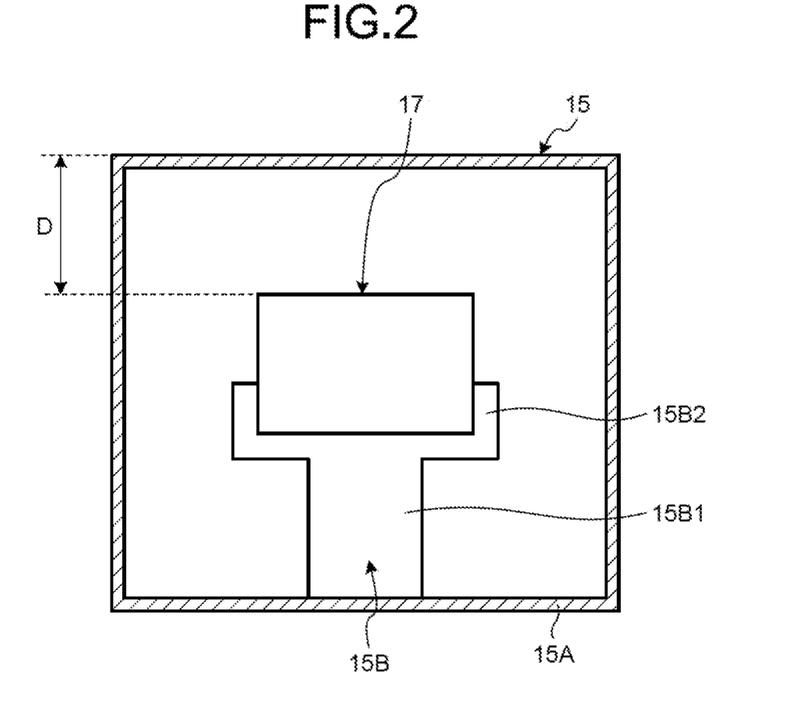
FIG. 2 is a schematic view of a battery housing enclosure according to the present embodiment.

FIG. 2 is a schematic view of the battery housing enclosure according to the present embodiment. In the present embodiment, the battery housing enclosure 15 includes a casing part 15A and a fixation part 15B as illustrated in FIG. 2. The casing part 15A is a portion corresponding to an enclosure of the battery housing enclosure 15 and has a hollow structure. The casing part 15A is capable of housing the battery 17 inside. The fixation part 15B is provided inside the casing part 15A. The fixation part 15B is a member configured to be capable of holding the battery 17 while keeping the battery 17 in a fixed state. For example, the fixation part 15B includes a support portion 15B1 and a holding portion 15B2. The support portion 15B1 is a member supporting the holding portion 15B2. The support portion 15B1 extends from an inner circumferential surface of the casing part 15A and supports the holding portion 15B2 on the leading end of the support portion 15B1. The holding portion 15B2 is, for example, a member that holds and fixes the battery 17. The fixation part 15B is provided in a position such that a distance D between the battery 17 fixed (held) by the holding portion 15B2 and the outer circumference of the battery housing enclosure 15 (the casing part 15A) is a certain distance. The distance D herein means the shortest distance between the battery 17 and the outer circumference of the battery housing enclosure 15 (the casing part 15A). The certain distance is a distance greater than or equal to an insulation distance as described above. Therefore, the battery housing enclosure 15 is capable of maintaining an insulation distance between the battery 17 and the outer circumference of the battery housing enclosure 15 by having the battery 17 fixed inside the casing part 15A with the fixation part 15B provided inside the casing part 15A. The structure of the battery housing enclosure 15 illustrated in FIG. 2 is an example. The battery housing enclosure 15 may have any desired structure that is an increased-safety explosion-proof enclosure, that is, any desired structure that can maintain an insulation distance between the battery 17 and the outside.

As illustrated in FIG. 1, the protective device housing enclosure 16 is an enclosure that is provided on the outside of the frame 11 and houses the protective device 18 inside. The protective device housing enclosure 16 is a flameproof explosion-proof enclosure that has a pressure resistance-enhanced explosion-proof structure. A pressure resistance-enhanced explosion-proof structure is an explosion-proof structure that enables an enclosure to withstand and is not damaged by internal explosion due to explosive gas having entered the inside of the enclosure and that prevents fire from being caused by igniting an external explosive atmosphere through all joint parts or structural opening parts of the enclosure. The protective device housing enclosure 16 may be any desired flameproof explosion-proof enclosure regardless of whether the enclosure is tightly sealed and regardless of whether the enclosure communicates with the outside. The protective device housing enclosure 16 is preferably smaller in size than the battery housing enclosure 15.

As described above, the explosion-proof apparatus 10 according to the present embodiment includes the frame 11 having a hollow shape, the air supply device 31 (a gas supply device), the electrical component 21, the battery 17, the protective device 18, the battery housing enclosure 15, and the protective device housing enclosure 16. The air supply device 31 is a device capable of supplying gas to the inside of the frame 11 and maintaining the inside at pressure higher than certain pressure. The electrical component 21 is disposed inside the frame 11. The battery 17 is a battery that supplies power to the electrical component 21. The protective device 18 is a device capable of stopping power supply from the battery 17 to the electrical component 21. The battery housing enclosure 15 is an increased-safety explosion-proof enclosure that is attached to the frame 11 and that houses a battery 17 therein. The protective device housing enclosure 16 is a flameproof explosion-proof enclosure that houses the protective device 18 therein. The explosion-proof apparatus 10 does not include, inside the battery housing enclosure 15, a management device that manages the parameters of the battery 17.

For example, when there is a decrease in internal pressure of the frame 11, there is a risk of explosive gas entering the inside of the frame 11. Given the risk, the explosion-proof apparatus 10 therefore needs to have the protective device 18 activated to stop power supply from the battery 17 to the electrical component 21 in order to prevent ignition from the electrical component 21. However, the battery 17 and the protective device 18 can be a fire-causing source that may ignite the explosive gas. Therefore, each of the battery 17 and the protective device 18 needs to be housed in an explosion-proof enclosure that is not an internally pressurized explosion-proof structure. A flameproof explosion-proof enclosure is preferable as the explosion-proof enclosure in terms of safety; however, a flameproof explosion-proof enclosure needs to have a pressure resistance capability and therefore tends to have a larger size and a heavier weight. In this case, the explosion-proof apparatus 10 inevitably has a heavier weight and a larger size than otherwise. The explosion-proof apparatus 10 is needed to have a lighter weight and a smaller size particularly when being a robot that travels.

The explosion-proof apparatus 10 according to the present embodiment is configured in the following manner as needed. Ignition from the protective device 18 with which an insulation distance is difficult to maintain is prevented by having the protective device 18 housed in the protective device housing enclosure 16, which is a flameproof explosion-proof enclosure. At the same time, the battery 17 is housed in the battery housing enclosure 15, which is a different enclosure than the protective device 18. To be more precise, in the explosion-proof apparatus 10 according to the present embodiment, the battery 17 is configured based on specifications that exclude a management device. This configuration eliminates the need to house the battery 17 in the flameproof explosion-proof enclosure, and the battery 17 is housed in the battery housing enclosure 15, which is an increased-safety explosion-proof enclosure. Thus housing the battery 17 in the battery housing enclosure 15 makes it possible to maintain an insulation distance for the battery 17 and consequently prevent ignition. Furthermore, an increased-safety explosion-proof enclosure can have a lighter weight and a smaller size than a flameproof explosion-proof enclosure. Thus, according to the explosion-proof apparatus 10, the battery 17 is housed in the battery housing enclosure 15 while ignition is prevented by having the protective device 18 housed in the protective device housing enclosure 16. Thus, increasing the size and the weight of the explosion-proof apparatus 10 can be avoided while ignition therein is prevented. Particularly because the battery 17 tends to be larger than the protective device 18, increasing the size and the weight can be suitably avoided when the battery 17 is housed in an increased-safety explosion-proof enclosure separately from the protective device 18.

The battery housing enclosure 15 includes the fixation part 15B that fixes the battery 17 to the inside of the battery housing enclosure 15. The fixation part 15B is provided in a position such that a distance between the battery 17 fixed and the outer circumference of the battery housing enclosure 15 is a certain distance. This battery housing enclosure 15 is capable of maintaining the battery 17 and the outer circumference of the battery housing enclosure 15 at a certain distance by means of the fixation part 15B. Therefore, according to this explosion-proof apparatus 10, the certain distance is maintained while increasing the size and the weight of the explosion-proof apparatus 10 is avoided. Thus, ignition from the battery 17 can be appropriately prevented.

In addition, the certain distance is a distance greater than or equal to a distance at which the battery 17 and the outer circumference of the battery housing enclosure 15 can be kept insulated from each other. According to this explosion-proof apparatus 10, the insulation distance is maintained between the battery 17 and the outer circumference of the battery housing enclosure 15. Thus, ignition from the battery 17 can be appropriately prevented while increasing the size and the weight of the explosion-proof apparatus 10 is avoided.

The battery housing enclosure 15 and the protective device housing enclosure 16 are provided outside the frame 11. The frame 11 is an internally pressurized explosion-proof enclosure and needs to have the internal pressure thereof maintained high. Therefore, as the size of the frame 11 becomes larger, the volume of gas that needs to be maintained at the internal pressure becomes larger, and it is more difficult to adjust the internal pressure. In the explosion-proof apparatus 10, the size of the frame 11 can be smaller by placing the battery housing enclosure 15 and the protective device housing enclosure 16 outside the frame 11. Therefore, according to this explosion-proof apparatus 10, the internal pressure can be suitably adjusted. A further effect of providing the battery housing enclosure 15 outside the frame 11 is, for example, that the battery 17 can be replaced without the need to open the frame 11 and with the internal pressure maintained.

Figure 3:
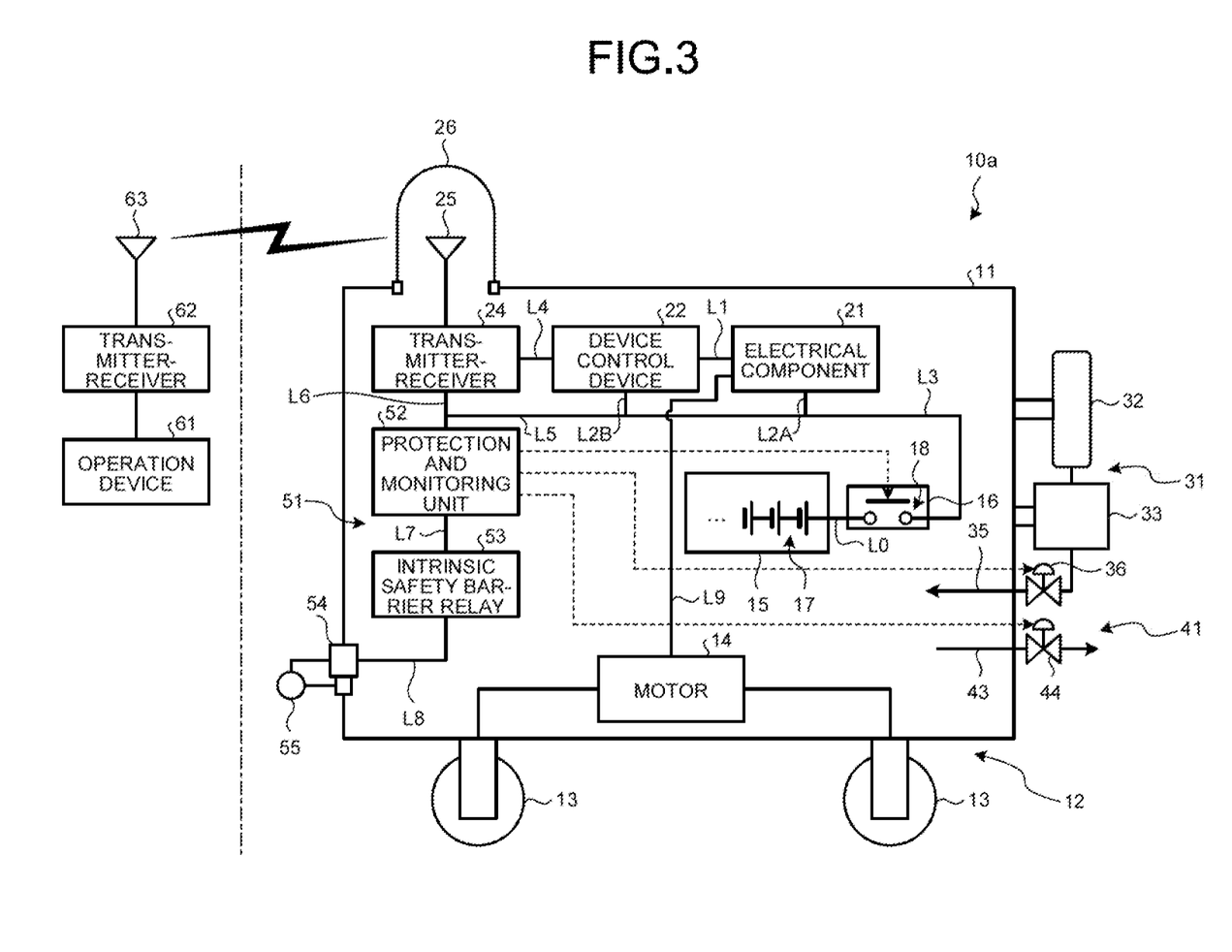
FIG. 3 is a schematic configuration diagram of another example of the explosion-proof apparatus according to the present embodiment.

However, the battery housing enclosure 15 and the protective device housing enclosure 16 may be provided inside the frame 11 as illustrated in FIG. 3. FIG. 3 is a schematic configuration diagram of another example of the explosion-proof apparatus according to the present embodiment. As illustrated in FIG. 3, an explosion-proof apparatus 10a has the battery housing enclosure 15 and the protective device housing enclosure 16 provided inside the frame 11. Even in this case, the battery housing enclosure 15 is configured of an increased-safety explosion-proof enclosure, and the protective device housing enclosure 16 is configured of a flameproof explosion-proof enclosure. Therefore, ignition can be appropriately prevented while increasing the size and the weight is avoided.

Modification

Figure 4:
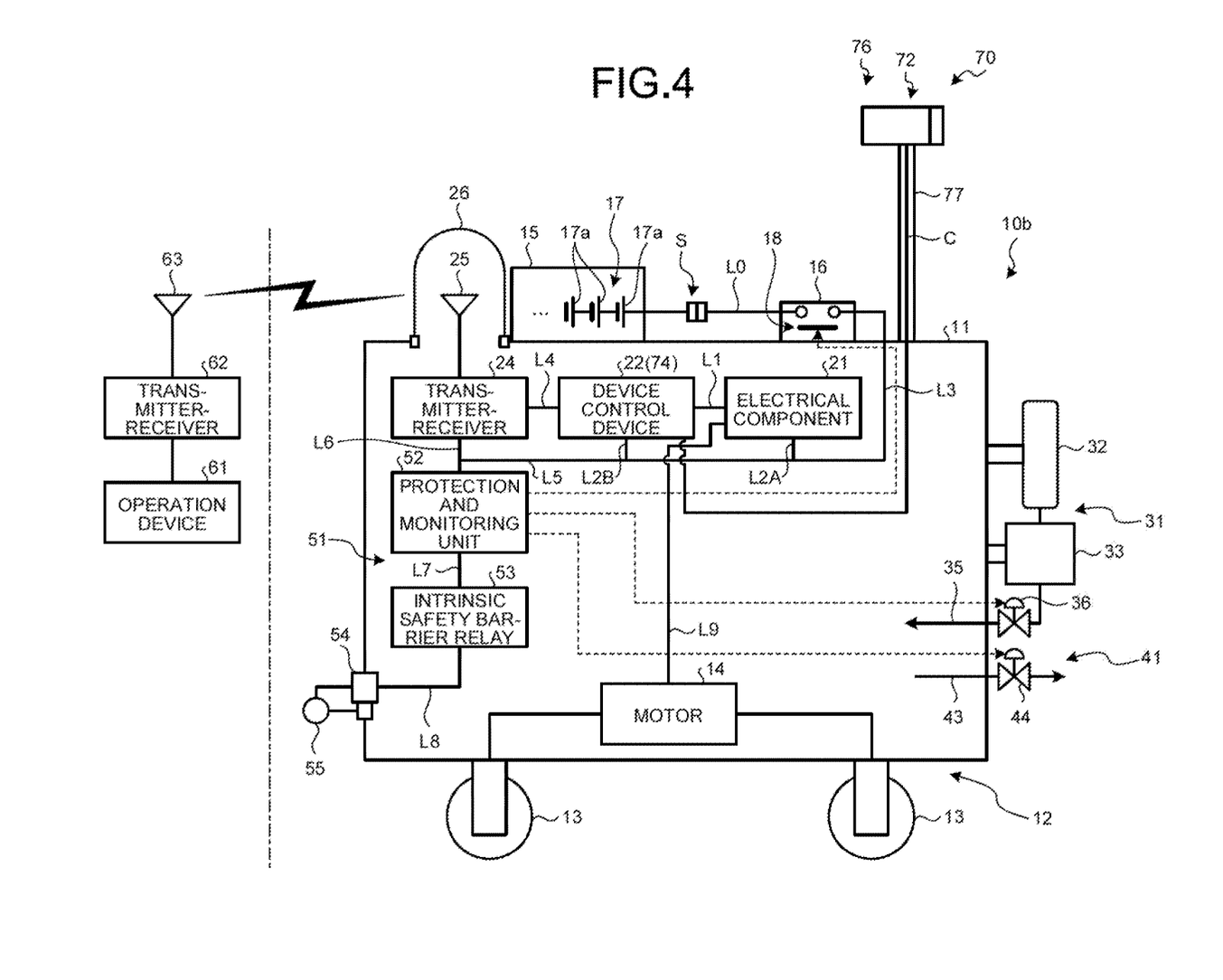
FIG. 4 is a schematic configuration diagram of an explosion-proof enclosure according to a modification.

Next, a modification of the present embodiment is described. An explosion-proof apparatus 10b according to the modification different from the explosion-proof apparatus 10 according to the embodiment in that the explosion-proof apparatus 10b includes an image capturing part 70. In the modification, descriptions of parts that have the same configurations as those in the embodiment are omitted.

FIG. 4 is a schematic configuration diagram of the explosion-proof enclosure according to the modification. As illustrated in FIG. 4, the explosion-proof apparatus 10b includes the image capturing part 70. The image capturing part 70 includes an image capturing unit 72 and a control unit 74. The image capturing unit 72 is provided outside of the frame 11 and captures images of the surroundings of the explosion-proof apparatus 10b. The control unit 74 performs processing for converting electric signals acquired by the image capturing unit 72 into image data. The image capturing unit 72 is housed in a camera housing enclosure 76. The camera housing enclosure 76 is connected to the frame 11 by an axial part 77 extending vertically upward from the frame 11. The camera housing enclosure 76, that is, the image capturing unit 72, is connected to the leading end of the axial part 77 and is positioned vertically higher than the frame 11.

The control unit 74 is provided inside the frame 11. The control unit 74 is configured as a part of the equipment control device 22 in the example illustrated in FIG. 4 but may be any desired device that is provided in the frame 11 regardless of whether the device is different from the equipment control device 22. The control unit 74 is connected to the image capturing unit 72 via a cable (signal wire) C. The cable C passes through, for example, the inside of the axial part 77.

Figure 5:
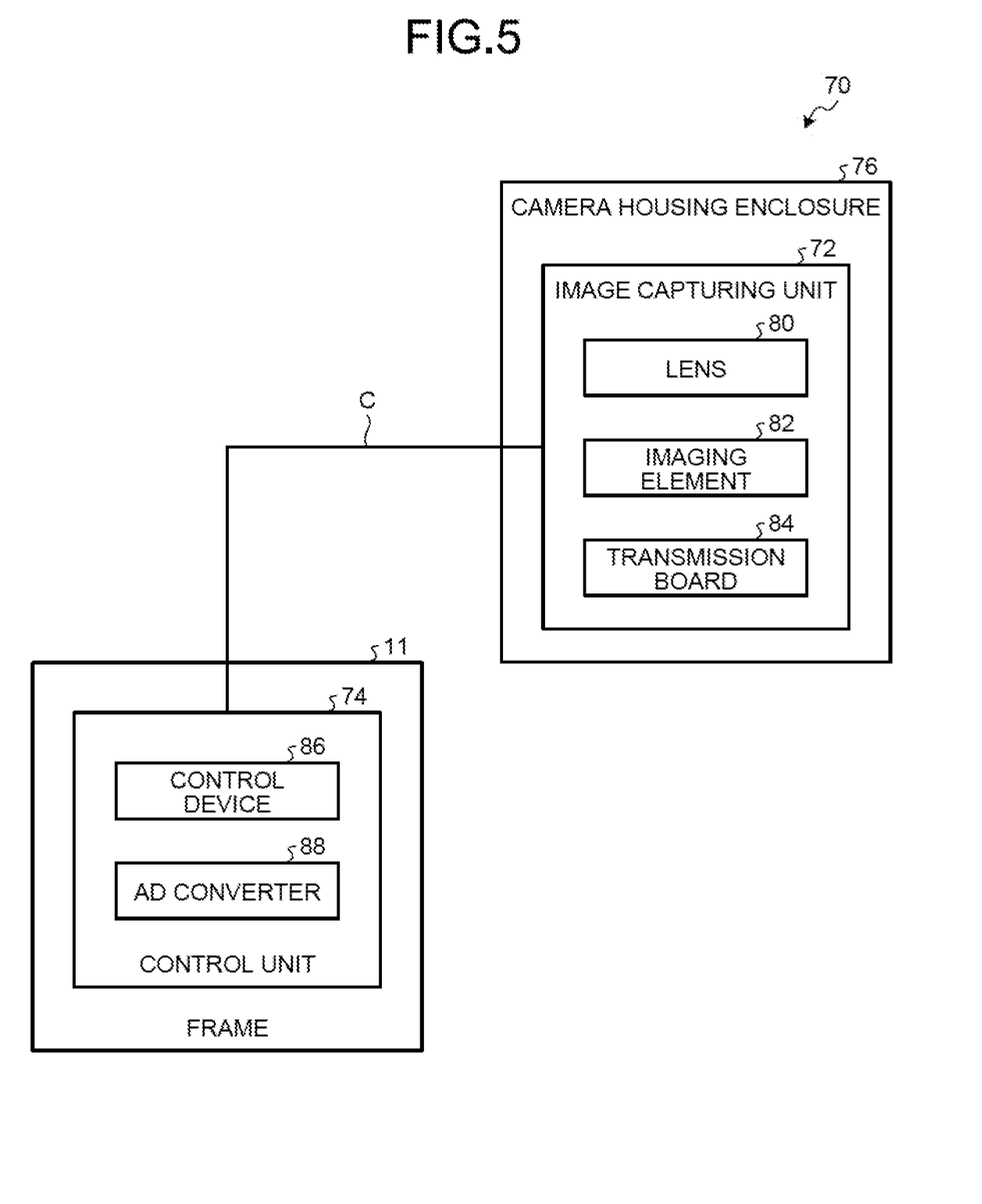
FIG. 5 is a schematic block diagram of an image capturing system.

FIG. 5 is a schematic block diagram of an image capturing system. As illustrated in FIG. 5, the image capturing unit 72 includes a lens 80, an imaging element 82, and a transmission board 84. The imaging element 82 is an image sensor that receives, that is, light (visible light) in the surroundings of the explosion-proof apparatus 10, through the lens 80 and converts the light into electric signals. The imaging element 82 is, for example, a charge coupled device (CCD) image sensor. The transmission board 84 is a board that is connected to the imaging element 82, and amplifies electric signals that the imaging element 82 generates by converting light.

As illustrated in FIG. 5, the control unit 74 includes a control device 86 and an analog-to-digital (AD) converter 88. The control device 86 is a camera control unit, that is, what is called a camera control unit (CCU), which is a device that controls the lens aperture of the imaging element 82 and tones of color in electric signals generated by the imaging element 82. The control device 86 acquires electric signals generated by that the imaging element 82, that is, electric signals amplified by the transmission board 84, from the transmission board 84 via the cable C. The AD converter 88 converts an analog electric signal that is acquired by the control device 86 into a digital electric signal. In the present modification, an electric signal converted into a digital electric signal by the AD converter 88 is transmitted to a device external to the explosion-proof apparatus 10 via the transmitter-receiver 24 and the antenna 25. This external device performs image processing on electric signals converted into digital electric signals, thereby generating, from the electric signals converted into digital electric signals, image data that is acquired by capturing an image of the surroundings of the explosion-proof apparatus 10. That is, the control unit 74 can be described as being configured to acquire, as data for an image captured of the surroundings of the frame 11, electric signals amplified by the transmission board 84. However, the control unit 74 may generate image data by itself by performing image processing on electric signals converted into digital electric signals.

Figure 6:
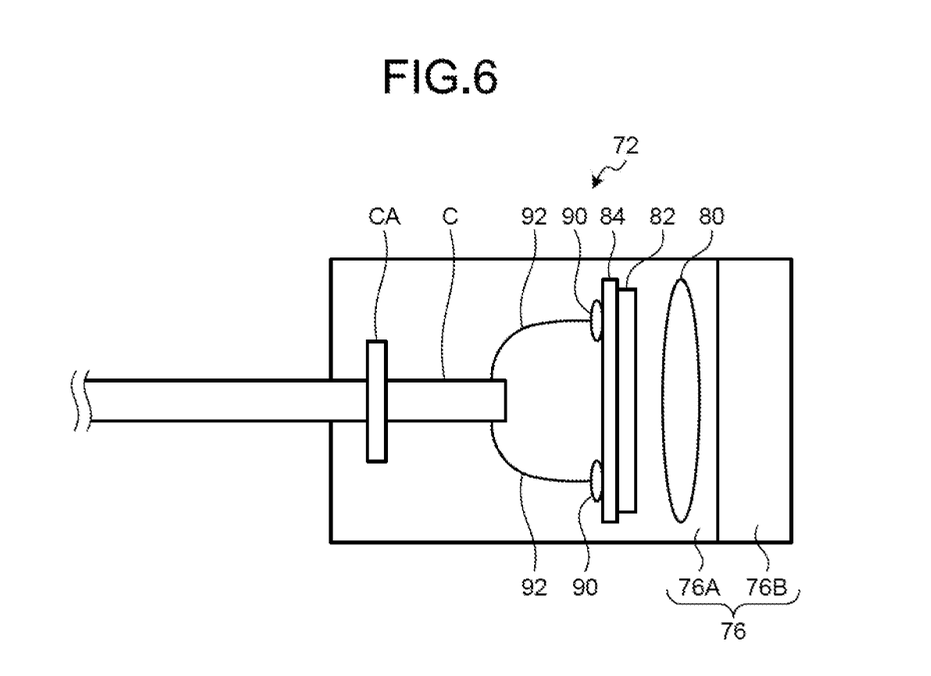
FIG. 6 illustrates an example of the structures of an image capturing unit and a camera housing enclosure.

FIG. 6 illustrates an example of the structures of the image capturing unit and the camera housing enclosure. The camera housing enclosure 76 is an explosion-proof enclosure, which is, to be more precise, a flameproof explosion-proof enclosure that has a flameproof explosion-proof structure. As illustrated in FIG. 6, the camera housing enclosure 76 includes a casing part 76A and a front face part 76B. The casing part 76A is an enclosure that is hollow and has one face thereof open. The front face part 76B is a transparent member that is provided on one of the faces of the casing part 76A that is open. The front face part 76B is made of, for example, flameproof glass. The image capturing unit 72 is housed inside the casing part 76A and is protected under the flameproof explosion-proof structure with the one open face of the casing part 76A shut off by the front face part 76B.

In the image capturing unit 72, the lens 80 is provided at a position that faces the front face part 76B. The imaging element 82 is provided at a position that faces the lens 80. That is, the imaging element 82 is positioned opposite to the front face part 76B across the lens 80. The imaging element 82 has a plate shape, and a surface thereof on one side that receives light faces the lens 80. The transmission board 84 is also a member that has a plate shape. One of the surfaces of the transmission board 84 faces and is in contact with a surface of the lens 80 that faces away from the imaging element 82. That is, the transmission board 84 makes surface contact with the imaging element 82. Connection pad parts 90 are connected to a surface of the transmission board 84, the surface being opposite to the imaging element 82. The connection pad parts 90 are, for example, electroconductive members, such as welds, capable of transmitting an electric signal.

The leading end of the cable C is housed inside the camera housing enclosure 76. The cable C is fixed to the camera housing enclosure 76 by means of a clamp CA. The cable C is connected to the connection pad parts 90 via connection cables (signal wires) 92. That is, the cable C is connected to the imaging element 82 via the connection cables 92, the connection pad parts 90, and the transmission board 84. Therefore, electric signals generated in the imaging element 82 can be transmitted to the control unit 74 through the cable C.

When a camera is provided to an explosion-proof apparatus, an explosion-proof structure needs to be provided to the camera. However, for example, when the explosion-proof apparatus 10 is used for patrol, the camera needs to be positioned at the human eye-level height and to be moved in position. In such a case, it is difficult to have the camera disposed inside the frame 11. For example, one possible manner is to extend the frame 11 vertically upward and dispose the camera in a part generated by the extension. In some cases, however, the part generated by the vertically upward extension is difficult to fill with high-pressure gas. When the camera is disposed outside the frame 11 instead, the entire camera needs to be housed in a flameproof explosion-proof enclosure, which is disadvantageous in terms of size and weight. In the case of the explosion-proof apparatus 10b according to the modification, the image capturing part 70 is separated into the image capturing unit 72 provided outside the frame 11 and the control unit 74 provided inside the frame 11. The imaging element 82 and the transmission board 84, which are minimum necessary equipment for capturing images (receiving light), are provided in the image capturing unit 72. The other equipment, that is, equipment that is unnecessary for capturing images (receiving light) in the control unit 74. Therefore, according to this explosion-proof apparatus 10b, a device provided outside the frame 11 can be minimized. Thus, a flameproof explosion-proof enclosure is made smaller, whereby increasing the size and the weight of the explosion-proof apparatus 10b can be avoided.

As described above, the explosion-proof apparatus 10b according to the modification includes the image capturing part 70, which captures the surroundings of the frame 11. The image capturing part 70 includes the imaging element 82, the transmission board 84, and the control device 86. The imaging element 82 is provided outside the frame 11. The transmission board 84 is provided outside the frame 11 while being connected to the imaging element 82. The transmission board 84 amplifies electric signals (electric signals into which light has been converted) acquired by the imaging element 82. The control device 86 is provided inside the frame 11 and is connected to the transmission board 84. The control device 86 acquires, as data for an image captured of the surroundings of the frame 11, electric signals amplified by the transmission board 84. In this explosion-proof apparatus 10b, the imaging element 82 and the transmission board 84, which are necessary for capturing an image, are provided outside the frame 11, and the control device 86 is provided inside the frame 11. Thus, a device provided outside the frame 11 can be minimized, whereby increasing the size and the weight of the explosion-proof apparatus 10b can be avoided.

In the image capturing part 70, as illustrated in FIG. 6, it is preferable that the imaging element 82 and the transmission board 84 be connected in such a manner that surfaces thereof are in contact with each other. When the imaging element 82 and the transmission board 84 are thus connected, the size of the camera housing enclosure 76 can be smaller than otherwise, increasing the size and the weight of the explosion-proof apparatus 10b can be avoided.

Figure 7:
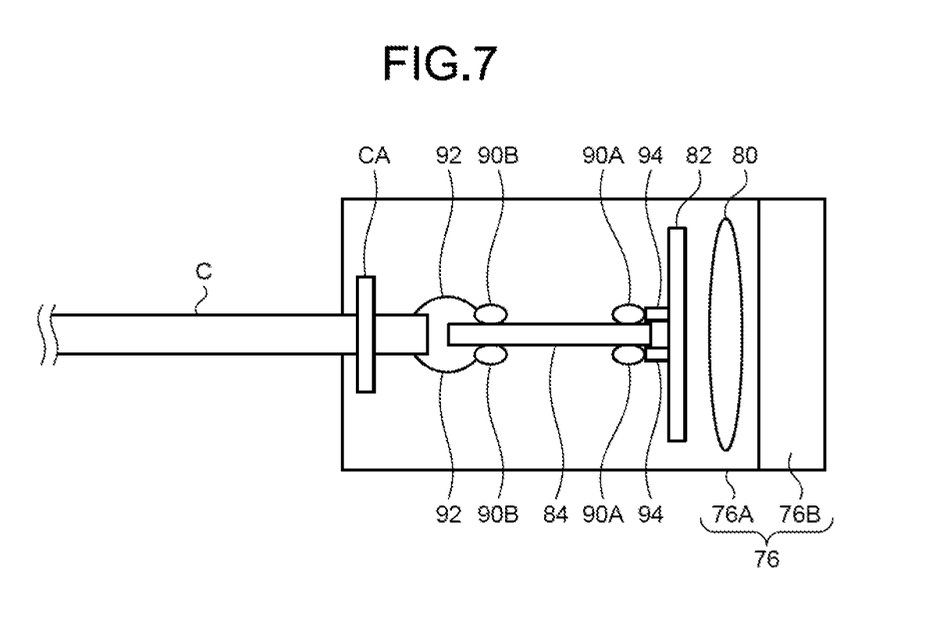
FIG. 7 illustrates another example of the structures of the image capturing unit and the camera housing enclosure.

However, the imaging element 82 and the transmission board 84 are not limited to being connected in such a manner that surfaces thereof are in contact with each other. The imaging element 82 and the transmission board 84 may be connected in any desired layout. FIG. 7 illustrates another example of the structures of the image capturing unit and the camera housing enclosure. In the example illustrated in FIG. 7, the transmission board 84 is disposed with an end face (lateral face) thereof facing a surface of the imaging element 82. Respective connection pad parts 90A are provided to both surfaces of the transmission board 84 in one side thereof facing the imaging element 82. The transmission board 84 is connected to the imaging element 82 by having those connection pad parts 90A connected to respective connection parts 94 connected to a surface of the imaging element 82. Respective connection pad parts 90B are further provided to both surfaces of the transmission board 84 in the other side thereof facing away from the imaging element 82. The cable C is connected to the connection pad parts 90B via the connection cables 92. The imaging element 82 and the transmission board 84 may have a T-shaped configuration in which the surface of the imaging element 82 and the end face of the transmission board 84 face each other.

While the embodiment of the present invention is described above, specifics of the embodiment are not intended to limit the embodiment. The above described constituent elements include those easily conceivable by the skilled person, those substantially identical to each other, and those falling within what is called the range of equivalents. The above-described constituent elements can be combined as appropriate. The constituent elements can be variously omitted, substituted, or changed without departing from the gist of the above-described embodiment.

REFERENCE SIGNS LIST

10 Explosion-proof apparatus
11 Frame
12 Moving device
15 Battery housing enclosure
16 Protective device housing enclosure
17 Battery
18 Protective device
21 Electrical component
22 Equipment control device
31 Air supply device

The invention claimed is:
1. An explosion-proof apparatus comprising:
a frame having a hollow shape;
a gas supply device configured to maintain inside of the frame at pressure higher than certain pressure by supplying gas to the inside;
an electrical component disposed inside the frame;
a battery configured to supply power to the electrical component;
a protective device configured to stop power supply from the battery to the electrical component;
a battery housing enclosure being an increased-safety explosion-proof enclosure configured to house the battery therein; and
a protective device housing enclosure being a flameproof explosion-proof enclosure configured to house the protective device, wherein
the battery housing enclosure and the protective device housing enclosure are provided outside of the frame,
the battery does not include a management device that manages parameters of the battery,
the protective device housing enclosure is an enclosure different from the battery housing enclosure, and
an explosion-proof connector being explosion proof is configured to connect the battery and the protective device, and is provided outside the battery housing enclosure and the protective device housing enclosure.

2. The explosion-proof apparatus according to claim 1, wherein the battery housing enclosure includes a fixation part that fixes the battery to inside of the battery housing enclosure, the fixation part being provided at a position such that a distance between the battery fixed and an outer circumference of the battery housing enclosure is a certain distance.

3. The explosion-proof apparatus according to claim 2, wherein the certain distance is a distance greater than or equal to a distance at which the battery and the outer circumference of the battery housing enclosure are kept insulated from each other.

4. The explosion-proof apparatus according to claim 1, further comprising an image capturing unit configured to capture an image of surroundings of the frame, the image capturing unit including
- an imaging element provided outside the frame;
- a transmission board provided outside the frame and connected to the imaging element to amplify electric signals that are acquired by the imaging element; and
- a control device provided inside the frame and connected to the transmission board to acquire, as data for the captured image of the surroundings of the frame, the amplified electric signals from the transmission board.

\* \* \* \* \*